3,297,716
MIXTURE OF 4-PROPYL-HYGRIC ACID AMIDES
Barney J. Magerlein, Portage Township, Kalamazoo County, Mich., assignor to The Upjohn Company, Kalamazoo, Mich., a corporation of Delaware
No Drawing. Filed June 15, 1964, Ser. No. 375,335
1 Claim. (Cl. 260—326.3)

This invention is related to a novel composition of matter and is particularly concerned with the production of 4-propylhygric acids, intermediates thereto, and a process therefor.

The novel products and the process of their invention can be illustratively represented by the following sequence of formulae:

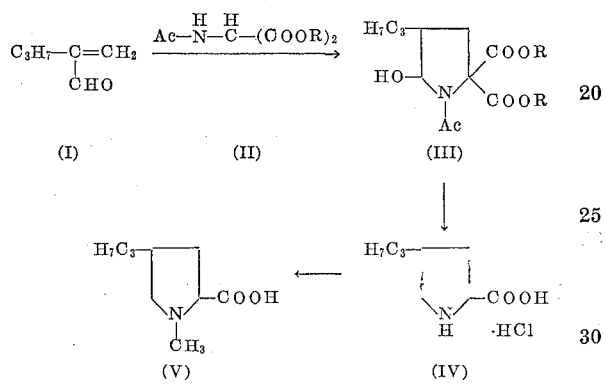

wherein R is a lower alkyl group having from 1 to 6 carbon atoms, and wherein Ac is the acyl group of a hydrocarbon carboxylic acid containing from 2 to 12 carbon atoms, inclusive.

In this total synthesis of 4-propylhygric acids (V), a mixture is obtained which contains, in equimolecular quantities, all four possible isomeric modifications of 4-propylhygric acids, namely:

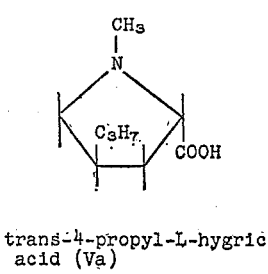

trans-4-propyl-L-hygric acid (Va)

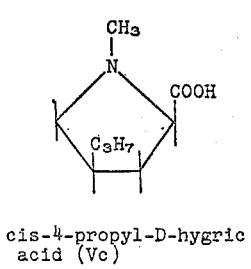

cis-4-propyl-D-hygric acid (Vc)

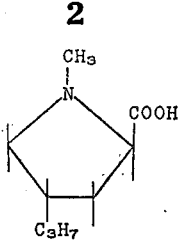

trans-4-propyl-D-hygric acid (Vb)

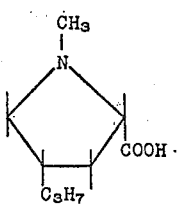

cis-4-propyl-L-hygric acid (Vd)

The mixture of the four acids above consists in effect of two racemic mixtures: (1) compounds Va and Vb; and (2) compounds Vc and Vd. This above-described mixture will be hereafter referred to as a biracemic mixture. [Similar 4-propylproline hydrochloride (IV) exists and is obtained in the process of this invention in a biracemic mixture of four isomeric modifications.]

The four acids Va, Vb, Vc and Vd can be separated from each other by (1) converting the mixture of acids to their amides; (2) chromatographically separating the racemic mixture of the trans-4-propylhygramides (Va and Vb)) from the racemic mixture of the cis-4-propylhygramides (Vc and Vd); (3) converting separately each racemic mixture into the d-camphorsulfonate salts; (4) separating the thus-formed diastereoisomers in each racemic mixture from each other by fractional crystallization in a water-ethanol system; (5) treating the separated camphorsulfonates with a base to obtain the separated amides of the four acids, Va, Vb, Vc and Vd, which (6) are hydrolyzed with a mineral acid to the amino acid mineral acid salts which (7) by treatment with silver carbonate give the free separated amino acid of structures Va, Vb, Vc and Vd.

The process of the present invention comprises: treating 2-propylacrelein (I) with a dialkyl acylaminomalonate (II) wherein the alkyl and acyl groups are defined as above, in the presence of a base, e.g. an alkali metal alkoxide, such as sodium or potassium methoxide or ethoxide, or the like to obtain the corresponding 1-acyl-2,2-dicarbalkoxy - 4 - propyl-5-hydroxypyrrolidine (III); converting compound III with tin and a mineral acid, e.g., hydrochloric acid, to a 4-propylproline mineral acid salt, e.g. the hydrochloride (IV); treating compound IV with (1) a base, e.g. silver carbonate or silver oxide, to obtain 4-propylproline, and alkylating the latter with formalin and hydrogen in the presence of a palladium-on-charcoal catalyst to obtain the mixture of 4-propylhygric acids (V) previously mentioned.

It is an object of the present invention to provide novel 1-acyl-2,2-carbalkoxy-4-propyl-5-hydroxypyrrolidines of Formula III and to provide the novel biracemic mixture of 4-propylhygric acids of formulas Va, Vb, Vc and Vd.

It is a further object of this invention to provide a process to make these compounds.

The novel biracemic mixture of isomeric 4-propylhygric acids is useful as a source of the component acids which can be reacted with amino sugars to form new antibiotics of the lincomycin type. The important new antibiotic lincomycin (U.S. Patent 3,086,912), for example, is one in which trans-4-propyl-L-hygric acid is present in combination with methyl thiolincosaminide, as shown in the formula

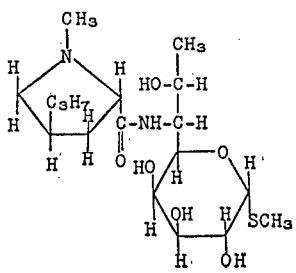

The 4-propylhygric acids, either individually or as the mixture, are important for conversion to their amides (as shown in the examples), which in turn can be converted to alkyl halide quaternary ammonium salts. The latter are electroconductive wetting agents and are useful in the production of electrocardiographic jellies, as shown subsequently. The mixture of compounds of formula V or each isolated 4-propylhygric acid moreover is a valuable buffering and antacid agent.

The following examples are illustrative of the process and products of the present invention but are not to be construed as limiting.

*Example 1.—1-acetyl-2,2-dicarbethoxy-4-propyl-5-hydroxypyrrolidine*

A mixture of 5.6 g. of 2-propylacrolein [Green et al., J. Chem. Soc. 3262 (1957)], 10 g. of diethyl acetamidomalonate and 0.25 ml. of sodium methoxide in 150 ml. of benzene was stirred for a period of three hours at room temperature (about 25° C.). The solution was neutralized with a few drops of acetic acid, clarified by filtration and the filtrate was evaporated. The residue was washed with water, dissolved in methanol and 1-acetyl-2,2-dicarbethoxy-4-propyl-5-hydroxypyrrolidine was precipitated by the addition of Skellysolve B hexanes. This procedure was repeated two more times to get pure 1-acetyl-2,2-dicarbethoxy-4-propyl-5-hydroxypyrrolidine.

*Example 2.—1-acetyl-2,2-dicarbopropoxy-4-propyl-5-hydroxypyrrolidine*

In the manner given in Example 1, reacting 2-propylacrolein with dipropyl acetamidomalonate resulted in 1-acetyl-2,2-dicarbopropoxy-4-propyl-5-hydroxypyrrolidine.

In the manner given in Example 1, using instead of diethyl acetamidomalonate other dialkyl acylaminomalonates and condensing them with 2-propylacrolein in the presence of sodium or potassium methoxide, ethoxide, propoxide, or the like, gave the corresponding 1-acyl-2,2-dicarbalkoxy-4-propyl-5-hydroxypyrrolidine. Representative compounds thus obtained include:

1-propionyl-2,2-dicarbopropoxy-4-propyl-5-hydroxypyrrolidine,
1-acetyl-2,2-dicarbomethoxy-4-propyl-5-hydroxypyrrolidine,
1-acetyl-2,2-dicarbobutoxy-4-propyl-5-hydroxypyrrolidine,
1-hexanoyl-2,2-dicarbobutoxy-4-propyl-5-hydroxypyrrolidine,
1-lauryl-2,2-dicarbethoxy-4-propyl-5-hydroxypyrrolidine, and the like.

*Example 3.—Biracemic mixture of 4-propylproline hydrochloride*

The 1-acetyl-2,2-dicarbethoxy-4-propyl-5-hydroxypyrrolidine, as obtained in Example 1, was suspended in 120 ml. of water and 127 ml. of concentrated hydrochloric acid, and 22.8 g. of granulated tin was added to the mixture. This mixture was refluxed for 1 hour, filtered to remove the metal, and the filtrate was evaporated in a vacuum. The residue was dissolved in 200 ml. of warm water which was then saturated with hydrogen sulfide, and the resulting precipitate was separated by filtration. The filtrate was treated again in the same manner and this was repeated until there was no further precipitation of tin sulfides. The filtrate was then lyophilized and the residue was dissolved in a small amount of water, extracted with ether and again lyophilized to give a residue which was dried at 55° C. in vacuo. This residue was crystallized from acetonitrile to give 1.62 g. of 4-propylproline hydrochloride of melting point 162–165° C., which upon further recrystallization amounted to 1.32 g. of 4-propylproline hydrochloride (biracemic mixture) of melting point 164–167° C.

*Analysis.*—Calcd. for $C_8H_{15}NO_2 \cdot HCl$: C, 49.61; H, 8.33; N, 7.23. Found: C, 49.24; H, 8.13; N, 7.53.

In the manner shown in Example 3, other 1-acyl-2,2-dicarbalkoxy-4-propyl-5-hydroxypyrrolidines can be converted to give biracemic mixtures of 4-propylproline hydrochlorides. Representative starting materials for this conversion are:

1-acetyl-2,2-dicarbopropoxy-4-propyl-5-hydroxypyrrolidine,
1-propionyl-2,2-dicarbopropoxy-4-propyl-5-hydroxypyrrolidine,
1-acetyl-2,2-dicarbomethoxy-4-propyl-5-hydroxypyrrolidine,
1-acetyl-2,2-dicarbobutoxy-4-propyl-5-hydroxypyrrolidine,
1-hexanoyl-2,2-dicarbobutoxy-4-propyl-5-hydroxypyrrolidine,
1-lauryl-2,2-dicarbethoxy-4-propyl-5-hydroxypyrrolidine, and the like

*Example 4.—4-propylprolines (biracemic mixture)*

To a well-stirred solution of 1.1 g. of 4-propylproline hydrochloride (biracemic mixture) in 11 ml. of water was added 827 mg. of silver carbonate. The mixture was stirred for 30 minutes at 26° C., for an additional 30 minutes on a steam bath, filtered, and the filtrate was evaporated to dryness. The residue was crystallized from ethanol to yield 310 mg. of 4-propylproline (biracemic mixture) of melting point 230–232° C. An additional amount of 4-propylproline was obtained by adding ethyl acetate to the mother liquors. A total of 710 mg. of 4-propylproline (biracemic mixture) was thus obtained.

*Example 5.—4-propylhygric acid and hydrochlorides (biracemic mixture)*

A solution of 710 mg. of 4-propylproline (biracemic mixture, Example 4) in 100 ml. of methanol containing 1 ml. of formalin was hydrogenated at 40 pounds pressure for a period of 2 hours in the presence of 1.4 g. of 10% palladium-on-charcoal catalyst. The catalyst was removed by filtration and the filtrate was evaporated to give as residue a biracemic mixture containing trans-4-propyl-L-hygric acid, trans-4-propyl-D-hygric acid, cis-4-propyl-L-hygric acid and cis-4-propyl-D-hygric acid.

This residue was dissolved in a few milliliters of methanol and the solution was filtered and treated with an excess of hydrogen chloride in ether. A precipitate of 4-propylhygric acid hydrochloride (isomer mixture) was obtained which was recovered by filtration; melting point, 163–166° C., rotation $[\alpha]_D^{25}$ 0°. After recrystallization from methanol the product had a melting point of 165–167° C.

*Analysis.*—Calcd. for $C_9H_{17}NO_2 \cdot HCl$: C, 52.04; H, 8.73; N, 6.75. Found: C, 51.74; H, 8.48; N, 7.13.

*Example 6.—4-propylhygric acid amides*

A solution of 1.04 g. of the biracemic mixture of 4-propylhygric acid hydrochlorides in 60 ml. of acetonitrile, 3 ml. of tributylamine and 13 ml. of acetone was cooled in an ice-water bath and thereto was added 0.66 ml. of isobutyl chloroformate. After stirring for 20 minutes, 4.8 ml. of concentrated ammonium hydroxide was added. The mixture was then stirred for 1½ hours and evaporated in vacuo. The residue was acidified and extracted with ether; the ether extracts were discarded. The aqueous solution was made alkaline with sodium hydroxide solution and extracted with methylene chloride. The methylene chloride extract was evaporated in vacuo to give a residue of 1.11 g. of 4-propylhygric acid amides (biracemic mixture) melting at 86–89° C. Recrystallization of this mixture from methanol raised the melting point to 112–116° C. This mixture could be chromatographically separated into trans-4-propylhygric acid amides (DL) and cis-4-propylhygric acid amides (DL) using a solvent system of methyl ethyl ketone:acetone:water in a ratio of 7.5:2.5:1.

A separation of the four isomers of 4-propylhygric acid was made on a larger run as described in detail below.

*Example 7.—Separation of the four isomers of 4-propylhygric acid*

A. SEPARATION OF CIS-4-PROPYL-D,L-HYGRAMIDES AND TRANS-4-PROPYL-D,L-HYGRAMIDES

A biracemic mixture of 3.3 g. of 4-propylhygric acid hydrochloride (Example 5) was dissolved in 160 ml. of acetonitrile containing 5.6 ml. of triethylamine. The solution was cooled to 0° C. and 2.2 ml. of isobutyl chloroformate was added. After stirring for ¼ hour 16 ml. of concentrated ammonium hydroxide was added. After 1 hour at 0° C. and 2 hours at 25° C. the mixture was evaporated to dryness in vacuo. The residue was acidified and extracted with ether; the ether extract was discarded. The aqueous solution was made alkaline with sodium hydroxide and extracted twice with methylene chloride. The extracts were combined, washed with water, dried, and evaporated to dryness, yielding 2.9 g. of a crystalline residue which consisted of a biracemic mixture of 4-propylhygramide.

This material was chromatographed over 400 g. of silica gel and eluted with an acetone (80%) water (20%) mixture. Fractions of 50 ml. each were collected and assayed by thin-layer chromatography. From this column there was obtained first pure trans-4-propyl-D,L-hygramide, then a mixture of trans-4-propyl-D,L-hygramide and cis-4-propyl-D,L-hygramide and finally pure cis-4-propyl-D,L-hygramide. The mixture of cis- and trans-4-propyl-D,L-hygramides was rechromatographed over silica gel and the cis and trans isomers which were obtained were added to the fractions already separated.

B. RESOLUTION OF TRANS-4-PROPYL-D,L-HYGRAMIDE

To a solution of 1.7 g. of trans-4-propyl-D,L-hygramide in 20 ml. of 56% ethanol was added 2.32 g. of d-camphorsulfonic acid. The mixture was warmed to 75° C. and 50% ethanol was added until solution was complete. The solution was then cooled to 25° C. and the crystals which separated were removed by filtration and washed with 50% ethanol. The crystals were recrystallized from ethanol-water until no change in rotation was observed. The crystals were then suspended in 100 times their weight of water and an excess of 5% sodium hydroxide solution was added. The solution was extracted repeatedly with methylene chloride which when dried and evaporated yielded one pure trans isomer.

From the original mother liquors, crystals of opposite rotation slowly precipitated. These crystals were also purified by recrystallization from ethanol-water to constant rotation. Treatment with alkali yielded the other optical isomer of the trans series.

In the same manner, the cis isomers can be resolved to provide cis-4-propyl-L-hygramide and cis-4-propyl-D-hygramide.

C. HYDROLYSIS OF RESOLVED AMIDES

Trans-4-propyl-L-hygramide (370 mg.) was heated under reflux for 4 hours in 20 ml. of 10% hydrochloric acid. The mixture was evaporated to dryness in vacuo. The residue was slurried with warm ethanol and filtered. Addition of ether to the filtrate precipitated trans-4-propyl-L-hygric acid hydrochloride, which could be recrystallized from ethanol-ether.

Treatment of an aqueous solution of trans-4-propyl-L-hygric acid hydrochloride with excess silver carbonate gave trans-4-propyl-L-hygric acid.

Similarly, the other isomeric 4-propylhygramides can be hydrolyzed with hydrochloric acid and treated with silver carbonate to give trans-4-propyl-D-hygric acid, cis-4-propyl-L-hygric acid and cis-4-propyl-D-hygric acid.

*Example 8.—Lincomycin from synthetic 4-propylhygric acid*

To a solution of 1.1 g. of 4-propylhygric acid hydrochloride in 40 ml. of acetonitrile and 1.5 ml. of triethylamine at 0° C. was added 0.7 ml. of isobutyl chloroformate. After 20 minutes' stirring at 0° C. a solution of 1.8 g. of methyl α-thiolincosaminide in 20 ml. of water was added. The reaction mixture was stirred for 1 hour at 0° C. and for 1½ hours at ambient temperature. The mixture was evaporated to dryness in vacuo and the residue, after dilution with 5 ml. of water, was lyophilized. The residue, thus obtained, was stirred with two 100-ml. portions of acetone and the acetone was decanted from insoluble material. The remaining acetone was removed in vacuo to yield 1.21 g. of a gummy residue. This residue was again stirred in acetone which was decanted from insoluble material. Acidification of the decanted acetone with dilute hydrochloric acid precipitated 400 mg. (17.0%) of partially crystalline material which was lincomycin hydrochloride.

*Example 9.—Dodecyl iodide quaternary ammonium salt of 4-propylhygramide (racemic mixture)*

To 3 g. of a mixture of the four stereoisomers of 4-propylhygramide (racemic mixture), prepared as in Example 7A, was added 12 g. of dodecyl iodide. After standing at room temperature overnight the reaction mixture was dissolved in 40 ml. of methanol, treated with decolorizing carbon, filtered and evaporated to dryness under reduced pressure. The residue was crystallized from ethyl acetate-ethanol to give a crystalline mixture of the dodecyl iodides of the four stereoisomers of 4-propylhygramide.

In the manner given in Example 9, other quaternary ammonium salts of 4-propylhygramides can be prepared by reacting a selected alkyl iodide, chloride, or bromide, wherein the alkyl group has from 1 to 20 carbon atoms, inclusive, with the 4-propylhygramide mixture. Representative compounds thus produced include the methyl, ethyl, propyl, isopropyl, butyl, pentyl, hexyl, heptyl, octyl, nonyl, decyl, undecyl, dodecyl, tetradecyl, hexadecyl, octadecyl and eicosyl iodide, bromide and chloride quaternary ammonium salts of 4-propylhygramide.

In the manner shown in Example 9, resolved stereoisomers of 4-propylhygramide, as obtained in Example 7, can be converted to the alkyl halide quaternary ammonium salt of the resolved 4-propylhygramides, such as the dodecyl iodide of trans-4-propyl-D-hygramide, trans-4-propl-L-hygramide, cis-4-propyl-D-hygramide and cis-4-propyl-L-hygramide.

Such quaternary ammonium salts, particularly those having a 1-alkyl group with 10 to 20 carbon atoms inclusive, are wetting agents which have antimicrobial and electroconductive properties. The alkyl halide quaternary ammonium salts of the stereoisomeric 4-propylhygramides in which the 1-alkyl group has between 10 and 20 carbon atoms, e.g. the dodecyl iodide quaternary ammonium salt of the stereoisomeric 4-propylhygramides, can be used as the active agent in electrocardiographic jellies. A suitable composition of an electrocardiographic jelly can be prepared as follows:

| | Parts |
|---|---|
| Glycerol | 5 |
| Starch | 10 |
| Quaternary ammonium salts | 60 |
| Water | 100 |

The jelly is prepared by mixing the starch, glycerol and water and then adding the selected quaternary ammonium salts, such as the dodecyl iodide of the stereoisomeric 4-propylhygramides.

I claim:

A biracemic mixture containing trans-4-propyl-L-hygramide, trans-4-propyl-D-hygramide, cis-4-propyl-L-hygramide and cis-4-propyl-D-hygramide.

References Cited by the Examiner

Fieser et al.: Organic Chemistry, QD 251, F5 (1956), C.6, pp. 178, 221, 226, 227, 242 and 274–275.

Hollins: Synthesis of Nitrogen Ring Compounds (1942), QD 401, H7, p. 36.

Moe et al.: J. Am. Chem. Soc., 70: 2763–5 (1948).

Theilheimer: Synthetic Methods of Organic Chemistry, QD 262, T4 C.2, volume 11, Reaction No. 478 (1957).

Wagner et al.: Synthetic Organic Chemistry, QD 262, W24, C.2, 1953, p. 8.

ALEX MAZEL, *Primary Examiner.*

HENRY R. JILES, *Examiner.*

J. A. NARCAVAGE, *Assistant Examiner.*